March 19, 1935. O. A. KNOPP 1,994,771
HEATING SYSTEM
Filed June 29, 1931 2 Sheets—Sheet 1
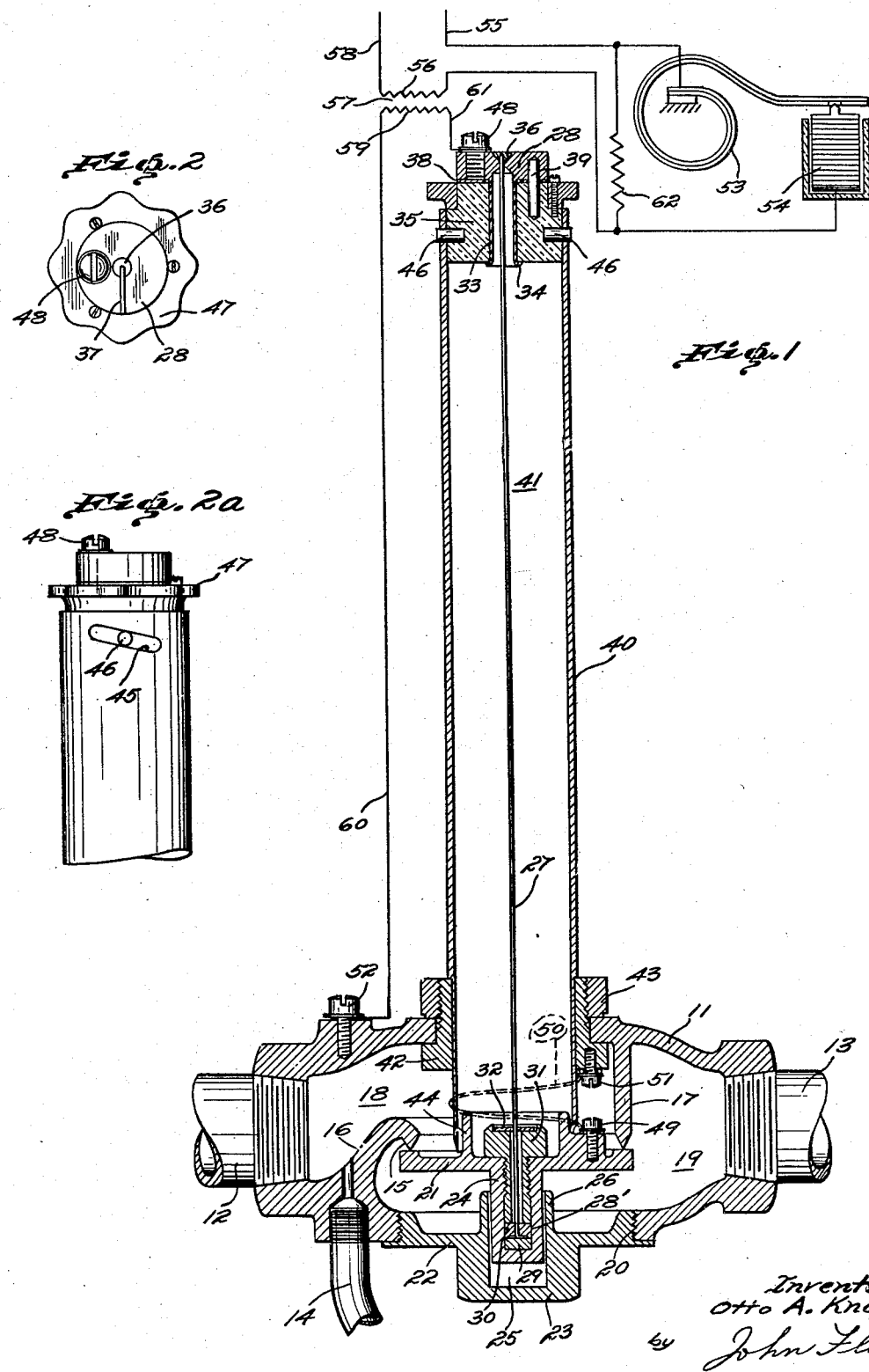
Inventor
Otto A. Knopp
by John Flam
Attorney

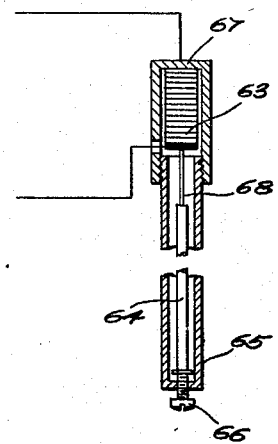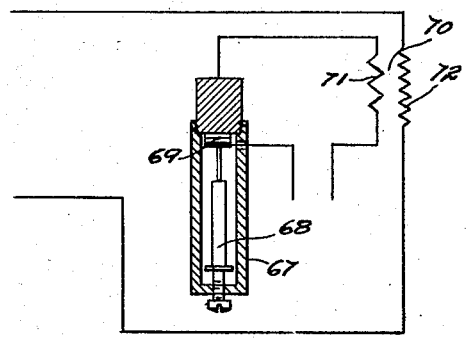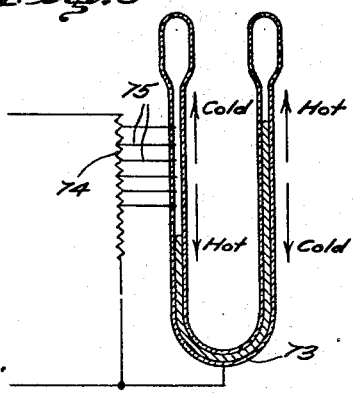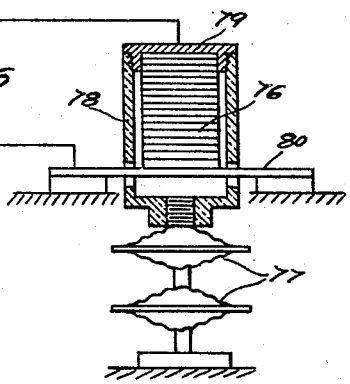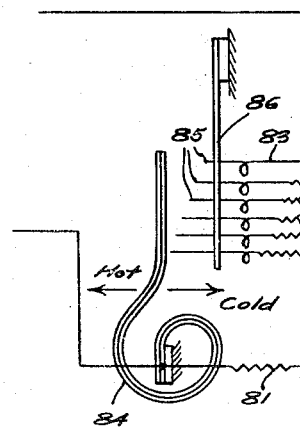

Patented Mar. 19, 1935

1,994,771

UNITED STATES PATENT OFFICE 1,994,771

HEATING SYSTEM

Otto A. Knopp, Oakland, Calif.

Application June 29, 1931, Serial No. 547,663

17 Claims. (Cl. 236—68)

This invention relates to a valve control system, and more particularly to a system for varying or adjusting the passage of a fluid (either gaseous or liquid) to a locality where it is used, in response to definite conditions that exist in relation to that locality, such as temperature or pressure.

For instance, a valve controlling the supply of gas to a heater for a room or rooms can be controlled to act in response to temperature in the room; or such a valve can be used to regulate the amount of steam fed to a system utilizing it, such as a steam heater or the like.

This application is a continuation in part of my application, Serial No 485,402, filed September 30, 1930 and entitled "Electric control valve".

It is one of the objects of my invention to provide a valve of simple and reliable structure that can be readily controlled.

It is not uncommon to utilize an electric control circuit for opening and closing such a valve. However, in most instances a failure of the current or an open circuit may leave the valve open, with corresponding danger of permitting the fluid controlled to escape. It is another object of my invention to prevent any such occurrence and to ensure the normal closure of the valve when the system is inactive.

I accomplish these objects by making use of the principle of expansion of metals when heated. For example, a wire through which an electric current passes can be mechanically connected with the valve closure, and arranged by expansion, to permit the valve closure to move to opening position when the heating is sufficient. It is accordingly another object of my invention to provide a compact and simple valve in which is incorporated these expansible elements.

It is still another object of my invention to make it possible to operate a valve so as to make the extent of its opening depend upon such functions as temperature or pressure, by the aid of an electric control system.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings:

Figure 1 is a sectional view of a valve embodying my invention, together with a diagrammatic representation of an electric controlling system therefore;

Fig. 2 is a view of the top of the valve;

Fig. 2a is a detail side elevation of a portion of the valve;

Figs. 3 to 7 inclusive are diagrams showing variations of the control system for the valve.

In Figs. 1 and 2, there is illustrated a valve body 11 that can be utilized to control the flow of a fluid medium for producing heat, such as gaseous or liquid fuel, or steam. This body is formed with an inlet 12 and an outlet 13. A pilot light connection 14 is also provided, leading from the inlet side of the valve, whereby the pilot stays supplied with fuel even when valve 11 is closed. A valve seat 15 is formed in a wall 16 that has a vertical extension 17. This wall separates the inlet and outlet passages or chambers 18, 19 except for the valve opening.

To facilitate assembly, the valve body 11 is formed with an opening 20 at the bottom sufficiently large to pass the valve closure 21, arranged to seat over the seat 15. This opening is threaded and a cover 22 is tightly fitted therein after the other parts of the valve are assembled. This cover 22 can be formed with a hexagonal boss 23 to facilitate tightening and removal thereof. Furthermore, this boss is also used as a guide for the stem 24 of closure 21, by being provided with a chamber 25 and an extending flange 26. It is apparent that when closure 21 is pulled up to seat on seat 15, as indicated, communication between the inlet and outlet passages 18 and 19 is interrupted.

In order to control the position of this closure 21, there is provided one or more expansible elements connected to this closure, the expansion of which is in alinement with the closure movement, for permitting the closure to drop away from the seat 15. In the present instance, there is shown an element such as a thin wire 27 that is connected at one end to the closure 21, and anchored at the top end to a relatively stationary terminal block 28.

The manner of attaching the wire 27 to the closure 21 will now be described. The stem 24 of closure 21 is formed with a recess 28'. In this recess a block 29 is tightly fitted, which block can be made of lead. A washer 30 is passed around the lower end of the wire 27. This wire passes entirely through the washer and is coiled between it and block 29. The washer 30 is firmly clamped over the block 29 to anchor the wire as by a hollow locking screw 31 threaded into recess 28' and engaging the top of washer 30. An insulation disc 32 is disposed in a shoulder in the top of screw 31, and can be made from mica, to close the aperture in the screw 31.

The top of the wire 27 is anchored into the block 28 which is provided with a long tubular extension 33 that is peened over at 34 to hold block 28 to an insulation support 35. The aperture 36 in the block 28 is countersunk and solder can be applied therein around the wire 27. Furthermore, a slot 37 can be provided in block 28 to accommodate a turned over end of the wire. A washer 38 can be interposed between block 28 and support 35. To prevent relative rotation, a dowel pin 39 can be provided between the members 28 and 35.

The support 35 is adjustably mounted on a metal tube 40 fixed to valve 11. This tube surrounds wire 27 and provides a dead air space 41 around it and thereby prevents the dissipation of heat from the wire when the wire is heated by the passage of an electric current therethrough. The tube 40 also serves to protect the wire 27 from mechanical injury. Tube 40 for example, can be pressed into a threaded bushing 42, which passes through an opening in the top of valve casing 11 and is held tightly in said opening by a nut 43. The nut 43 acts against the top edge of the aperture through which bushing 42 extends and provides a fluid tight closure for the valve. Tube 40 extends down into telescopic relation with a flange 44 formed on closure 21 around the head of screw 31, thereby shielding the lower end of wire 27 from the fluid flowing through the valve, which would otherwise extract heat from the wire.

Adjustment of support 35 in the top of tube 40 is provided for manual adjustment of the position of valve closure 21, and for providing the proper tension of wire 27 when the valve is closed, wire 27 being then unheated. This adjustment can be accomplished by the aid of one or more helical slots 45 (Fig. 2a) cut in tube 40, and in each of which is engaged a pin 46 fastened in a radial position in support 35. It is apparent that by turning the support 35, as by a hand control 47, the axial position of support 35 in tube 40 can be adjusted.

It is also apparent that the tube 40, wire 27, closure assembly 21, and the block assembly at the top of the tube can be assembled in bushing 42, and the entire assembly can be passed through aperture 20 in the bottom of valve 11, for replacement or repairs.

Current can be fed through wire 27 by way of a post 48 in block 28, thence through wire 27, washer 30, block 29, closure 21, post 49 on closure 21, wire 50 (which embraces the lower end of tube 40), post 51 on bushing 42, the body 11 of the valve, to a post 52 on the body. As the electric current heats the wire 27, this wire will expand in accordance with the temperature attained, and the valve 11 will be opened correspondingly.

The current led through wire 27 can be automatically controlled in response to such functions as pressure or temperature. In the form shown in Fig. 1, there is shown a thermal control, as by the aid of a spiral bimetallic element or strip 53. The contraction of this spiral on temperature decrease can act to exert a pressure on a pressure type resistance, such as a carbon pile 54.

The complete circuit from an appropriate A. C. source can be traced as follows: from conductor 55, bimetallic strip 53, pile 54, primary winding 56 of a transformer 57, to the other conductor 58. The secondary winding 59 of the transformer 57 is wound to provide any appropriate current to the wire 27, to which it is connected as by the aid of connections 60, 61. A high resistance 62 can bridge the carbon pile to prevent complete opening of the control circuit and consequent pitting of the carbon disks due to sparking.

The spiral bimetallic element 53 can be replaced by other forms of thermostats. Thus in Fig. 3, the carbon pile 63 is acted on by a rod 64 enclosed in a tube 65. The rod can be made of non-expanding metal, such as invar, and the tube 65 of hard rubber or other material of high expansion coefficient. When tube 65 expands due to heat, the rod 64 drops down as its lower end is supported on an adjustable screw 66 in the bottom of tube 65. This reduces the pressure of the pile 63 against the top metal plate 67 and increases the resistance. A heat insulation bar 68 can be interposed between the bar 64 and the pile 63.

It is possible to reduce the length of the rod and tube as well as the carbon pile by interposing a step-up transformer between the carbon pile and the control circuits, whereby the degree of control required from the pile is reduced. Such a form is shown in Fig. 4. Here the tube 67 and rod 68 are arranged as in Fig. 3, but are shorter, and pile 69 is also shorter and can be made from as few as two discs. In this case, the control transformer 70 includes the low voltage primary 71 connected in series with the pile; and the high voltage secondary 72 connecting into the control circuit.

In Fig. 5, the control is effected by a thermometer 73 having two legs. The mercury column therein rises and falls in reverse order in the columns as the temperature varies, and sections 74 of resistances in the control circuit are shorted in succession by the column as it rises in the left hand tube, corresponding to a decrease in temperature. This short circuiting is effected by contacts 75 embedded in the wall of the tube and exposed to the column inside thereof.

In Fig. 6, the carbon pile 76 in the control circuit has its pressure relieved on temperature increase by the heat expansion cells 77, connected to a yoke 78 of insulation material and acting on top of the pile. A metal cap 79 serves as a connection to the top, and is carried by the yoke. The bottom of the pile rests on a stationary conductor 80.

The manner of successive short circuiting of resistances can be also accomplished as shown in Fig. 7. Here the main resistance 81 is in the control circuit, but can be bridged by a succession of resistances 82 or by a short circuit 83 when the bimetallic spiral 84 moves toward the right. The contacts 85 controlling the shunting of the resistances are supported on a flexible element 86 and are arranged to be engaged in succession by the element 84. The resistances 82 and connection 83 are flexibly connected to the contacts 85. The spring 86 offers very little resistance to the contact pressure.

I claim:

1. In a device of the character described, a valve body forming a valve seat, a closure therefor, a temperature expansible element connected to said closure, and in alinement with the movement of the closure, means for passing a heating current through said element, said element extending within the valve body, and a shield surrounding said element where it connects to the valve closure.

2. In a heating system, a valve for controlling a medium used for producing heat, said valve including a movable valve closure, a temperature expansible wire for operating the closure and having its length alined with the movement of the valve closure, means for passing a heating current through the wire to control the valve opening, and means for varying said heating current, comprising a pressure resistance, and temperature responsive means for varying the pressure thereon.

3. In a heating system, a valve for controlling a medium used for producing heat, said valve including a movable valve closure, a temperature expansible wire for operating the closure and having its length alined with the movement of the valve closure, means for passing a heating current through the wire to control the valve opening, and means for varying said heating current, comprising a pressure resistance, and a bimetallic element for varying the pressure on the resistance.

4. In a heating system, a valve for controlling a medium used for producing heat, said valve including a movable valve closure, a temperature expansible wire for operating the closure and having its length alined with the movement of the valve closure, means for passing a heating current through the wire to control the valve opening, and means for varying said heating current, comprising a pressure resistance, a rod for varying the pressure on the resistance, said rod having a low coefficient of expansion, and a temperature expansible support for one end of the rod.

5. In a heating system, a valve for controlling a medium used for producing heat, said valve including a movable valve closure, a temperature expansible wire for operating the closure and having its length alined with the movement of the valve closure, means for passing a heating current through the wire to control the valve opening, and means for varying said heating current, comprising a pressure resistance, and an expansible cell responsive to temperature for varying the pressure on the resistance.

6. In a heating system, a valve for controlling a medium used for producing heat, said valve including a movable valve closure, a temperature expansible wire for operating the closure and having its length alined with the movement of the valve closure, means for passing a heating current through the wire to control the valve opening, and means for varying said heating current, comprising a series of resistances, and temperature responsive means for controlling the resistances.

7. In a heating system, a valve for controlling a medium used for producing heat, said valve including a movable valve closure, a temperature expansible wire for operating the closure and having its length alined with the movement of the valve closure, means for passing a heating current through the wire to control the valve opening, and means for varying said heating current, comprising a series of resistances, and an expansible conducting liquid for controlling the resistances.

8. In a heating system, a valve for controlling a medium used for producing heat, said valve including a movable valve closure, a temperature expansible wire for operating the closure and having its length alined with the movement of the valve closure, means for passing a heating current through the wire to control the valve opening, and means for varying said heating current, comprising a series of resistances, and a bimetallic element for controlling the short circuiting of said resistances.

9. In a valve structure, a valve body having an inlet and an outlet passage, a valve closure arranged between the two passages, a temperature expansible wire for operating the valve closure, a tube structure surrounding and supporting the wire, means for supporting said structure on the valve body, and a removable cap for the body to permit removal and replacement of the tube structure, valve closure and wire as a unit with respect to the valve body.

10. In a valve structure, a valve body having an inlet and an outlet passage, a valve closure arranged between the two passages, a temperature expansible wire for operating the valve closure, a tube structure surrounding and supporting the wire, means for supporting said structure on the valve body, a removable cap for the body to permit removal and replacement of the tube structure, valve closure and wire as a unit with respect to the valve body, means for passing a heating current through the wire, and means for varying the current through the wire.

11. In a device of the character described, a valve including a movable valve closure and its seat, a temperature expansible wire suspending the closure and having its length alined with the movement of the valve closure, and means for passing a heating current through the wire to elongate it for permitting the closure to move away from its seat.

12. In a heating system, a valve for controlling a medium used for producing heat, said valve including a movable valve closure, a temperature expansible wire for operating the closure and having its length alined with the movement of the valve closure, means for passing a heating current through the wire to control the valve opening, and thermo-responsive means for varying said heating current.

13. In a heating system, a valve for controlling a medium used for producing heat, said valve including a movable valve closure, a temperature expansible wire for operating the closure, means for passing a heating current through the wire to control the valve opening, and thermo-responsive means for varying said heating current.

14. In a valve for controlling the passage of a heating medium, a movable valve closure, means forming a seat therefor, a temperature expansible wire for operating the closure and having its length alined with the movement of the valve closure, means for passing a heating current through the wire, and means for so supporting the wire that the temperature of the support is maintained substantially unaffected by variations in temperature of the wire.

15. In a valve for controlling the passage of a heating medium, a movable valve closure, means forming a seat therefor, a temperature expansible wire for operating the closure and having its length alined with the movement of the valve closure, means for passing a heating current through the wire, and means whereby the operation of the valve closure is due substantially en- 16. In a valve for controlling the passage of a heating medium, a movable valve closure, means forming a seat therefor, a temperature expansible wire for operating the closure and having its length alined with the movement of the valve closure, means for passing a heating current through the wire, and a support for the wire and separated from the wire by a substantial distance transverse to the length of the wire, to limit the temperature rise of the tubular support, when the wire is heated.

17. In a valve for controlling the passage of a heating medium, a movable valve closure, means forming a seat therefor, a temperature expansible wire for operating the closure and having its length alined with the movement of the valve closure, means for passing a heating current through the wire, and a support for the wire and separated from the wire by a substantial distance transverse to the length of the wire, to limit the temperature rise of the tubular support, when the wire is heated, said support and wire having substantially the same coefficient of heat expansion.

OTTO A. KNOPP.